United States Patent Office 3,504,271
Patented Mar. 31, 1970

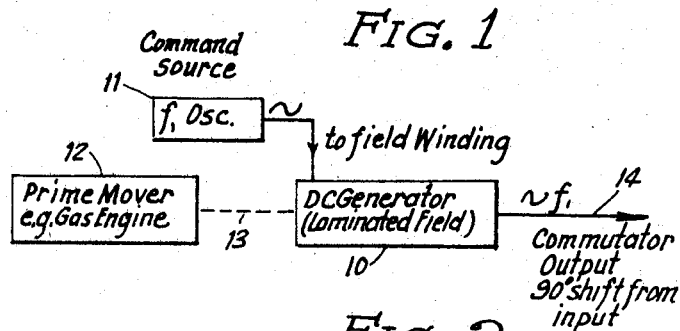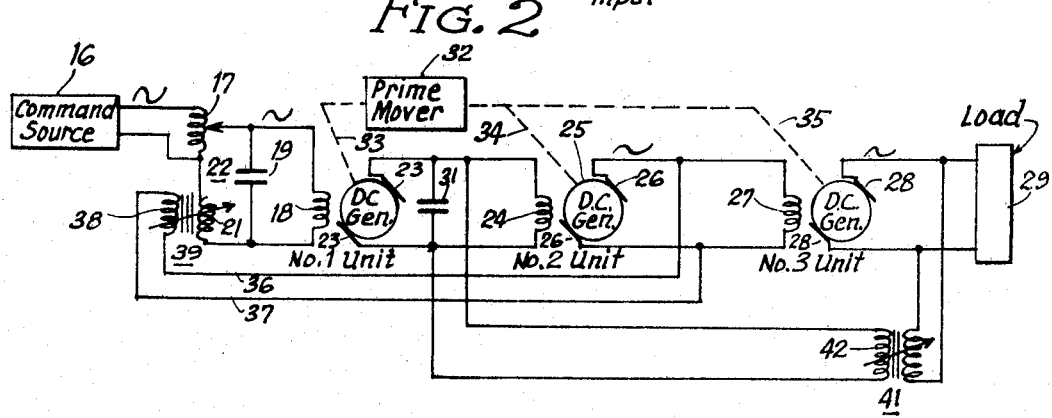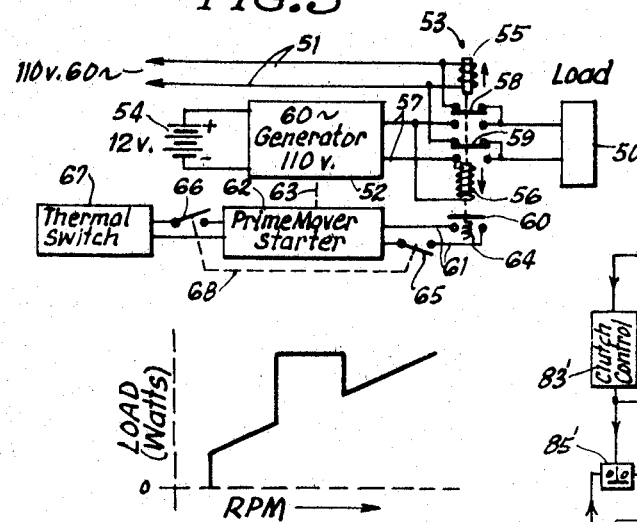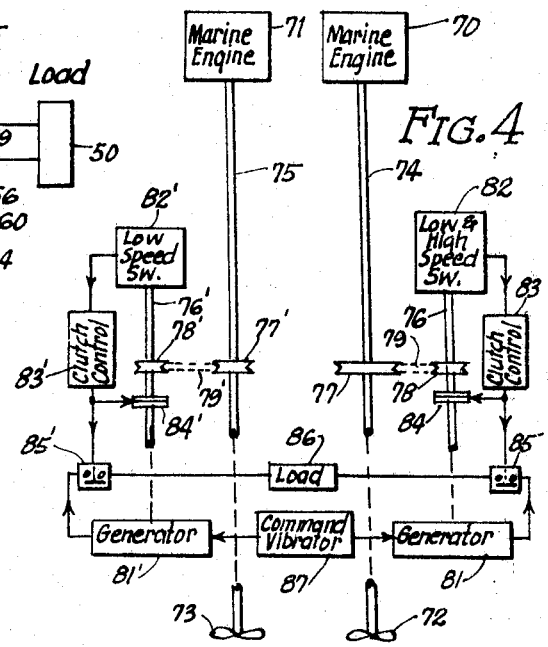

3,504,271
GENERATION OF CONSTANT FREQUENCY
ELECTRIC POWER AT VARIABLE SPEEDS
Ulises A. Sanabria, Wilmette, and Robert J. Corbett,
Chicago, Ill., assignors to National Energy Corporation,
Chicago, Ill., a corporation of Illinois
Filed May 9, 1968, Ser. No. 727,918
Int. Cl. H02p 9/14
U.S. Cl. 322—61                             7 Claims

ABSTRACT OF THE DISCLOSURE

An alternating current generating system consisting of plural generators, with a source of alternating current exciting the field of one generator and the output of that generator employed to excite the field of the other generator. Feedback from the output of the second generator is applied to the field of the first generator.

PRIOR ART

Patent No. 2,528,111 to Buckthal, Oct. 31, 1950, describes a conventional direct-current generator with two pole pieces having a field winding excited by a constant frequency alternating current through a resonant circuit comprising the field winding shunted by a condenser and with output voltage varying with speed or regulated through mechanical means responsive to the speed of the prime mover driving the generator.

Patent No. 2,854,617 to Johnson, Sept. 30, 1958, compares a frequency proportional to the speed of an alternator with another frequency, which may be constant, for controlling the magnetic field of the alternator to control the frequency of the alternator's output.

Patent No. 3,001,124 to Johnson, Sept. 19, 1961, shows in FIG. 4 a DC generator having its field excited by an alternating current and producing an alternating current on its output brushes.

THE PRESENT INVENTION

The present invention relates to the generation of alternating current utilizing rotary apparatus and more particularly to a method and apparatus for controlling the frequency of the generated current independently of the speed of rotation of the generating apparatus.

Speed regulation of a prime mover to secure a constant frequency from an alternator directly connected thereto is seldom if ever constant other than when averaged over an increment of time which is large relative to the time interval of a single cycle from the alternator. The difficulty as well as the expense increases greatly when it is attempted to drive an alternator at a constant speed with mechanical power taken from a shaft driven at varying speeds.

The general object of the invention is to provide useful amounts of constant frequency alternating current utilizing variable speed prime movers and requiring relatively minute amounts of electric power input.

Other objects and advantages of the invention will become apparent from the following description when read in connection with the accompanying drawing in which:

FIG. 1 is a block diagram illustrating the basic operating system of the invention;

FIG. 1a represents an oscillograph of the output from the system shown in FIG. 1;

FIG. 2 is a conventionalized showing of a preferred embodiment of the invention;

FIG. 3 shows schematically an embodiment of the invention useful as a standby or auxiliary power source;

FIG. 4 shows partly in block diagram the invention utilized as a local electric power supply for a twin-engine boat; and FIG. 5 is a graph utilized in explaining the operation of the embodiment shown in FIG. 4.

In accordance with the present invention a direct current type generator has its field separately excited by an alternating current of controlled frequency, usually constant, and is rotated at or above the critical speed at which the output power exceeds the input power dissipated in the field. Above the critical speed the power output increases as the square of the increase in speed, e.g., a particular two pole-32 segment rotor generator with one watt input to its field produced one watt from the rotor at approximately 6000 r.p.m., at 12,000 r.p.m. the rotor output was 4 watts and at 18,000 r.p.m. the rotor output was 9 watts. It is thus apparent that this arrangement effectively constitutes an AC power amplifier. With 3 such generator units connected in cascade the power output increases exponentially with increase in speed so that an amplification of 1000 is obtainable, e.g. 5 watts input to the first of the 3 units produced 5000 watts output from the last of the three cascaded units. As will be described below a portion of the output is fed back to share the field input power load making possible the greater amplification per generator unit. Output may be obtained at lower speeds by connecting the generators with their fields in series and their armatures in series and then switching to cascade when the critical speed is attained. Also, since the critical speed relates to the polar speed, generators with 4 or more poles and brushes may be employed when slower driving speeds are desired.

The operation of the basic unit of the invention will be clear from a consideration of FIG. 1 which shows a laminated field DC generator 10 connected to have its field winding separately excited by an alternating current from a suitable command source such as an oscillator 11 having an output frequency of $f_1$ which may be 60 cycles per second and will be so presumed throughout this specification unless otherwise stated. A prime mover 12, or other source of mechanical power, through a shaft 13 rotates the generator 10 to produce an alternating current output on a lead 14 at the command frequency $f_1$ which is 90° out of phase with the field input current from the oscillator 11. Above a minimum or critical speed required for the output on the lead 14 to exceed the power dissipated in the field of the generator 10 the power output on the lead 14 increases as the square of the increase above said critical speed. Therefore the system of FIG. 1 is a true AC power amplifier with precise frequency regulation.

As represented in FIG. 1a the output of the generator 10 is sinusoidal with a commutator-imposed high frequency ripple which may be readily filtered or may be made self-cancelling by mounting two armatures on a single shaft with their commutator segments staggered by about one half the width of a segment and connecting the two in parallel through their brushes.

In the cascade arrangement shown in FIG. 2 a command source 16 which may be a battery powered vibrator providing an alternating current output, such as 60 cycles, is connected through a variable auto transformer 17 to excite a field winding 18 of a laminated commutator type generator comprising a generating unit No. 1. A capacitor 19 connected across the field winding 18 together with a portion of the transformer 17 and the secondary winding 21 of a transformer 39 hereinafter discussed comprises a resonating driver circuit 22 which functioning as a conservative circuit supplies energy dissipated in the field winding 18 of the generator unit No. 1. As indicated in the drawing, unit No. 1 is a DC generator provided with brushes 23 positioned to pick off the generated alternating current which is then utilized to excite the field 24 of a similar generating unit No. 2, the commutator 25 of which is also provided with brushes 26 for picking off the alternating current generated thereby, which in turn is utilized to excite the field 27 of another similar generating unit No. 3 the output of which as picked up by commutating brushes 28 is available to energize any suitable load 29. A condenser 31 may be connected across the brushes 23 to remove any undesirable ripple component. Although the three generating units Nos. 1, 2 and 3 may be separately driven at different unregulated speeds, as here shown they preferably are driven at identical speeds by a prime mover 32 such as an internal combustion engine through common drive shafts 33, 34 and 35. A portion of the output of generating unit No. 2 is connected through leads 36 and 37 to the primary winding 38 of a variable transformer 39 the secondary 21 of which is included in the resonating circuit 22. In a similar manner a portion of the output of the generating unit No. 3 is fed back to the field 24 of the generating unit No. 2 through a variable transformer 41 the secondary winding 42 of which together with the capacitor 31 cooperates with the field winding 24 to provide a resonating circuit. The transformers 39 and 41 serve as isolation transformers.

The above described cascade operation is, of course, not limited to the three generating units here shown for the purpose of describing how relatively low power from a command source can be greatly amplified to provide a large amount of power to the load 29. For example: Feedback from the output of the generating unit No. 2 may supply ⅔ of the input to the unit No. 1 thereby reducing the power requirement of the command input to at least ⅓ of what would otherwise be required.

Voltage regulation is another advantage available from the cascade configuration shown in FIG. 2 by making the in-phase feedback voltage higher than necessary to produce maximum output and so selected that a zero load the output voltage is depressed and rises with increasing load to midrated load and then due to the limiting effect of the internal resistance of the generator decreases gradually with further increases in the load so that the rise and fall of the output voltage above and below the desired level can be held to approximately 2%. Furthermore, the same circuit causes the output voltage to rise with decreasing speed and also curtails the natural tendency of the voltage to rise with increasing speed. Preferably the respective values of the feedback ratios to the first and second stages are selected so that the first feedback system maintains voltage over the first half of the expected speed variation and the second feedback system takes care of the second half of the speed variation, as well as automatically making the proper demand on the input command source 16. A practical supply of 100 watts for an input command oscillating at 60 cycles can thus range from 5 watts to 100 watts on demand for a wide range in both rotating speed and load. The rising voltage feature on load increase is especially valuable in starting induction motors for household appliances.

Commercial electric power failures are not infrequent and often are serious as well as quite costly to many users who lack stand-by power to operate food freezers, furnaces, and the like requiring 60 cycle current. The present invention provides a feasible system for stand-by as well as what might be called a partial substitute for public utility power and one such system is shown in FIG. 3 wherein a load 50 is connected to commercial power lines 51 or to a generator 52 depending upon the position of a differential switch 53. The generator 52 may consist of the generating system, including the prime mover 32, shown in FIG. 2 and provided with a battery 54 for energizing the command source 16. As here shown, a relay 55 of the differential switch 53 is energized from the power line 51 while another relay 56 connected across the output terminals 57 of the generator 52 is not energized because the generator 52 is not operating, hence contacts 58 and 59 are held closed as shown. The relay 56 is made to be stronger than the relay 55 so that whenever the generator 52 is operating the relay 56 overcomes the pull of the relay 55 to move the contacts 58 and 59 to disconnect the load 50 from the power lines 51 and to connect it to the output leads 57 of the generator 52. Another contact 60 provided on the switch 53 also moves to close a circuit through leads 61 to a prime mover starter 62 which through a shaft 63 starts the generator 52 if it is not already running. The switch 53 is suitably biased as by a spring 64 to connect the generator 52 to the load 50 and complete the starter circuit 61 in the event of a power failure on the lines 51. Of course the foregoing switching operations may be performed manually.

Another important use for the generator 52 is to conserve energy for at least a part of the time. This may be accomplished with the arrangement of FIG. 3 by utilizing the head produced by the prime mover to warm a building while using the output of the generator to operate appliances or even lights. To this end a switch 65 is provided to open the starter circuit 61 when a switch 66 is closed to connect a thermal or other automatic switch 67 to the starter 62. The switches 65 and 66 may have a mechanical coupling 68. With this arrangement whenever the space heater (prime mover) is turned on by the switch 67 the load 50 is switched from relatively expensive commercial power on the lines 51 to the relatively cheap locally generated power.

Inasmuch as one of the great advantages of the system provided by the present invention is that constant frequency generation occurs over a wide range of speed, the invention will probably find its immediate greatest use in mobile vehicles requiring constant frequency alternating current but the prime movers of which normally go through large speed variations, e.g. boats, automobiles, airplanes, etc. An exemplary application is schematically shown in FIG. 4 as installed on a boat having 2 marine engines 70 and 71 which drive a starboard propeller 72 and a port propeller 73 through drive shafts 74 and 75, respectively. Changes in speed from say trolling speed to high speed travel may be unfavourable to the life or performance of a generator and for this reason it is preferred to provide 2 generating units one of which operates through the range of low speed to high intermediate speed while the other unit operates through the range of low intermediate speed to the high speed. The overlapping speed ranges will be the highest power output of the 2 units working together.

Referring again to FIG. 4, the starboard drive shaft 74 drives a shaft 76 through a suitable power transmitting means such as pulleys 77 and 78 and a belt 79. The ratio between the speed of the drive shaft 74 and the driven shaft 76 is selected in accordance with the parameters involved. A generating unit 81 which preferably comprises at least 2 generators is adapted to be connected to be operated by the driven shaft 76 whenever a speed responsive switch 82 sends a signal to a clutch control circuit 83 to engage a clutch 84. The signal from the switch 82 also closes a switch 85 to connect the output of the generator unit 81 to a load 86. The switch 82 is set to be closed throughout the above mentioned range of low speed to high intermediate speed. The port drive shaft 75 operates in an identical manner to drive another generating unit 81' throughout the above mentioned range of low intermediate speed to high speed and therefore like parts are designated by like reference numerals primed. A command vibrator 87 common to the generating units 81 and 81' maintains constant in-phase frequency alternating current to the load 86 whenever the marine engines 70 and 71 are running above a preselected speed.

The graph shown in FIG. 5 represents the output available to the load 86 and plainly shows the effect of the overlapping speed ranges.

It will be evident that the arrangement described in connection with FIG. 4 functions equally well from a single drive merely by mounting the 2 pulleys 77 and 77' to be driven from a single shaft so that the system is available to automobiles, trucks and any other source of mechanical rotary power which ordinarily varies over a wide range of speeds. Although it will be obvious to those skilled in the art that other compounding methods are available for extending the speed range, it is considered that the disclosed embodiments are the simplest and least expensive because of the advantages inherent in the circuitry herein disclosed.

The embodiments described for the purpose of disclosing the fundamental features of the invention are not to be taken as limiting since many changes and adaptations will be obvious to those skilled in the art without departing from the scope of the appended claims.

We claim:

1. In apparatus for producing alternating current having a controlled frequency the combination comprising
   at least two generators individually having poles and armature structures provided with the windings, commutators and brushes of a conventional separately-excited direct current generator,
   a source of alternating current at the control frequency connected to excite the field winding of one of said generators, and
   means connecting the brushes of said one generator to excite the field winding of the other of said generators.

2. Apparatus in accordance with claim 1 including means coupling a portion of any output across the brushes of said other generator in feedback relation to the alternating current exciting the field winding of said one generator.

3. Apparatus in accordance with claim 1 including means mechanically coupling said generators so that they rotate at the same polar speed.

4. Apparatus in accordance with claim 2 wherein the portion of the alternating current fed back into the field exciting circuit produces a voltage across the field winding higher than the voltage required to produce maximum output across the brushes of said other generator.

5. Apparatus in accordance with claim 1 wherein said generator poles are of laminated construction.

6. In an electric generating system utilizing a variable speed prime mover the method of producing a constant frequency alternating current of substantilly constant voltage which comprises
   causing at least two conventional separately-excited direct current generators to be driven at the same polar speed by the prime mover,
   exciting the field of one of said generators with a constant frequency alternating current to produce on the brushes of said one generator an alternating current of said constant frequency,
   causing said alternating current produced on said brushes of said one generator to excite the field of another of said generators to produce on the brushes of said other generator an alternating current having said constant frequency, and
   causing a portion of the alternating current produced on the brushes of said other generator to be fed back into and in phase with the alternating current exciting the field of said one of said generators.

7. The method in accordance with claim 6 wherein the in-phase feedback is greater than necessary to produce maximum output and the amount of said feedback is so selected that at zero load the output voltage is depressed and rises as the load increases to approximately midrated load.

References Cited

UNITED STATES PATENTS

| 2,528,111 | 10/1950 | Buckthal | 322—61 |
| 2,539,273 | 1/1951 | Ringland | 322—61 |
| 3,225,286 | 12/1965 | Wysocki | 322—61 |

ORIS L. RADER, Primary Examiner

H. HUBERFELD, Assistant Examiner

U.S. Cl. X.R.

307—84